United States Patent

[11] 3,591,734

[72] Inventor Don W. Abbott
Indianapolis, Ind.
[21] Appl. No. 735,629
[22] Filed June 10, 1968
[45] Patented July 6, 1971
[73] Assignee Recorded Sales Visual Presentations, Inc.
Indianapolis, Ind.

[54] A SYSTEM FOR SELECTIVELY CONTROLLING MULTIPLE OPERATIONS
3 Claims, 3 Drawing Figs.

[52] U.S. Cl. ........ 179/100.2 S
[51] Int. Cl. ........ G11b 23/36
[50] Field of Search ........ 179/100.2 S, 100.3 D, 100.4 D, 100.1, 100.1 PS, 2 R, 6 R, 100.1 DR; 340/171; 331/68, 59

[56] References Cited
UNITED STATES PATENTS

| | | | |
|---|---|---|---|
| 2,811,588 | 10/1957 | Julie | 179/100.1 |
| 3,026,769 | 3/1962 | Thiele et al. | 179/100.2 X |
| 3,200,206 | 8/1965 | Johnson | 179/100.1 |
| 3,227,814 | 1/1966 | Ferris et al. | 179/100.1 |
| 3,305,645 | 11/1967 | Nisbet | 179/100.2 |
| 3,480,738 | 11/1969 | Meyer et al. | 179/100.2 |

*Primary Examiner*—Bernard Konick
*Assistant Examiner*—Raymond F. Cardillo, Jr.
*Attorney*—Trask, Jenkins and Hanley

ABSTRACT: A system for the recording and playback of a tape record in which a plurality of relay switches are operated to control a corresponding plurality of electricaLly operated components. A console is provided having pushbutton switches coupled to operate oscillators which in turn energize the relay switches. The oscillator outputs are also coupled to a tape recorder for making a recording of the sequence and duration of pushbutton switch closures. The output of the tape recorder is coupled back to the oscillators so that when the recorder is played back the relay switches are closed in the same sequence and for the same duration as when the pushbutton switches are manually operated. The contacts of the relays may be used to close circuits to control lighting, slide projection, and other desired functions.

INVENTOR
DON W. ABBOTT
BY
Trask, Jenkins & Hanley
ATTORNEYS

INVENTOR
DON W. ABBOTT
BY
ATTORNEYS

A SYSTEM FOR SELECTIVELY CONTROLLING MULTIPLE OPERATIONS

BACKGROUND OF THE INVENTION

Prepared programs, such as audiovisual presentations used at sales meetings or the like, are often repeated many times for various groups, and it is often necessary to control many functions and components during their presentation. For example, it may be necessary to control a slide or moving picture projector, the lighting in a room, a tape recorder, the curtains of a stage, and various other components and functions. Such controls must be made sequentially and their timing may be critical under some applications. It is an object of this invention to provide a control system by which an audiovisual program may be recorded, said system being capable of automatically presenting the program at a later time.

SUMMARY OF THE INVENTION

In accordance with the invention, I provide a device for sequentially controlling the operation of a plurality of components and functions. A console is provided having a control circuit for each component which is to be controlled, and the output signal from each control circuit is coupled to operate a switch which in turn controls one of the components. The control circuit output signals are also coupled to a recording device such as a tape recorder. The signals placed on the tape can then be played back through the control circuits to operate the switches. In particular, each component or function which is to be operated by the console is connected to a separate relay switch in the console, and each relay switch is controllable by separate pushbutton selector switches on the console. The selector switches are connected to the various control circuits, each of which comprises an oscillator, an amplifier, and a tuned circuit which passes the frequency of the oscillator to which it is coupled.

Closure of a selector switch causes its associated oscillator to emit a signal which is applied through its amplifier to energize one of the relays. Another output from each amplifier is connected to the tape recorder. The playback signal from the tape recorder is coupled through each of the amplifiers to the tuned circuits which are connected to the oscillators in the respective control circuits. An output from a tuned circuit causes its associated oscillator to gain operate its relay. If a lecture or other audio presentation must be made a part of the recorded program, then a stereo tape recorder may be used; one channel recording the frequency signals from the chosen oscillators, and the other channel recording the audio program. The operator records a program by pressing the selector switches to operate the various components and by applying the audio signals to the tape on the recorder. The program may then be repeated by playing back the signal on the tape recorder to reproduce the audio program and to energize the relays in their proper sequence so that the components are operated in accordance with the original recorded program.

BRIEF DESCRIPTION OF THE DRAWING

The accompanying drawing illustrates the invention.

In such drawing.

DETAILED DESCRIPTION OF THE PREFERRED EMBODIMENT

Figures 1, 2:
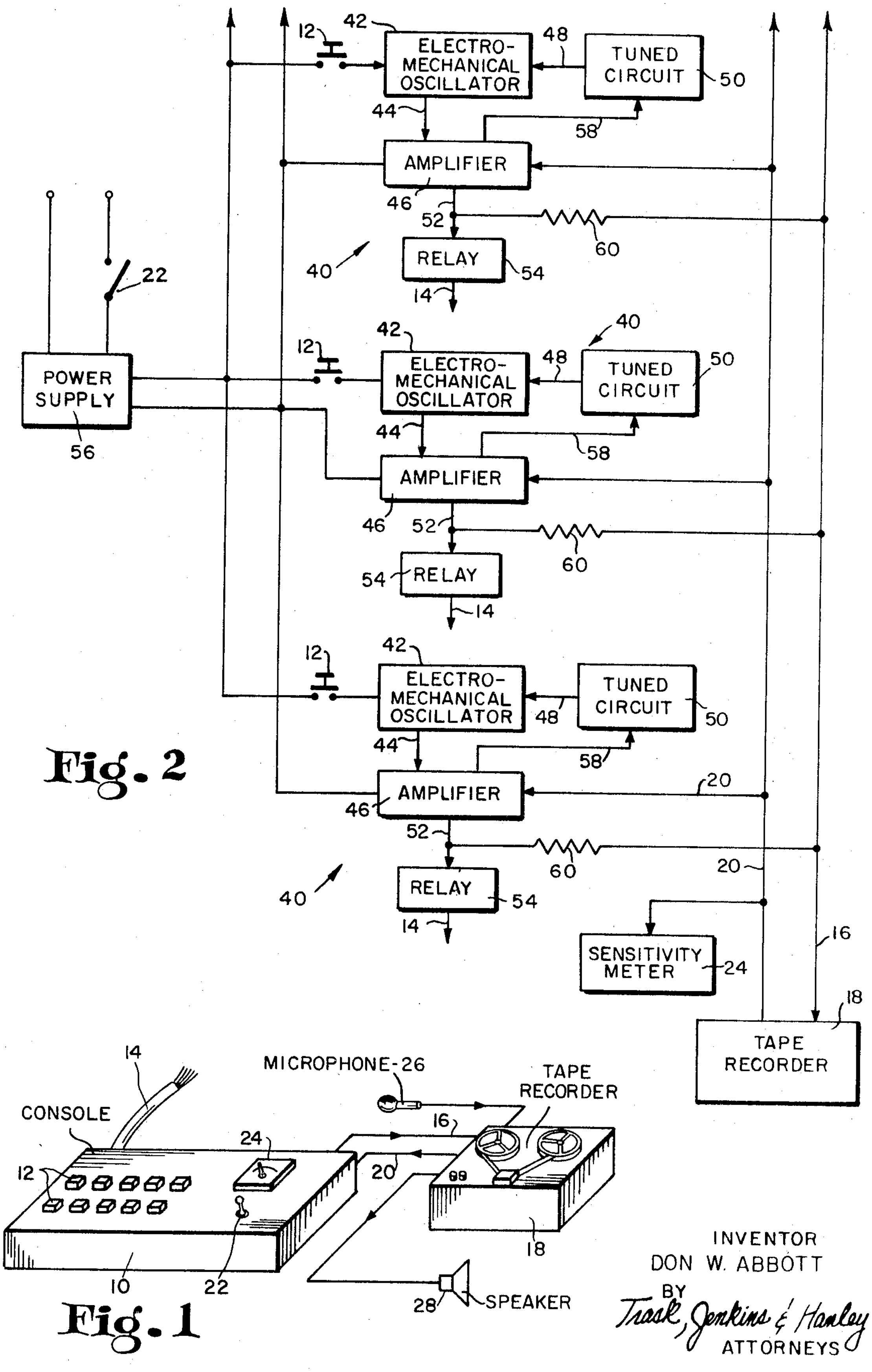
FIG. 1 is a pictorial representation embodying my invention, and showing a control console and tape recorder.
FIG. 2 is a block diagram showing more particularly the system of FIG. 1.

As shown in FIG. 1, I provide a console 10 having a plurality of pushbutton selector switches 12 mounted thereon. The selector switches operate separate control circuits which energize relay switches within the console. The relay switches have their contacts connected to conductors 14 for completing the power circuits for external components such as slide projectors or lights, etc. Various components are thereby controllable from the remote location of the console. The outputs of the control circuits are also connected together and coupled through a conductor 16 to the input of a recording device such as a tape recorder 18. The playback or output lead 20 from the tape recorder is coupled back to the console and to the various control circuits to again operate the relay switches when the tape recorder signal is played back. The console 10 is provided with an on-off switch 22, which controls the operation of a power supply for the control circuits, and with a sensitivity meter 24 for indicating the amplitude of the playback signal into the console from the tape recorder. The amplitude of the playback signal is adjusted at the tape recorder 18 to provide the proper signal level as an input to the control circuits. Desirably, the tape recorder is equipped for stereo operation, and a microphone 26 and speaker 28 are coupled respectively to the input and output leads of the second channel of the recorder.

In the operation of the system, the operator shows the switch 22 to energize the power supply and then proceeds to perform a program by speaking or applying other audio signals into the microphone 26, and by controlling other functions such as the curtains on a stage, the advancing of a slide projector, the operation of a tape recorder or movie projector, etc., by pressing the buttons 12 which correspond to the circuit-completing output leads 14. When a program has been fully recorded on the tape recorder 18, it may be repeated by playing back the tape and applying the information on the audio channel to the speaker 28 while coupling the signals from the other channel through the control circuits to energize the relays.

Figure 3:
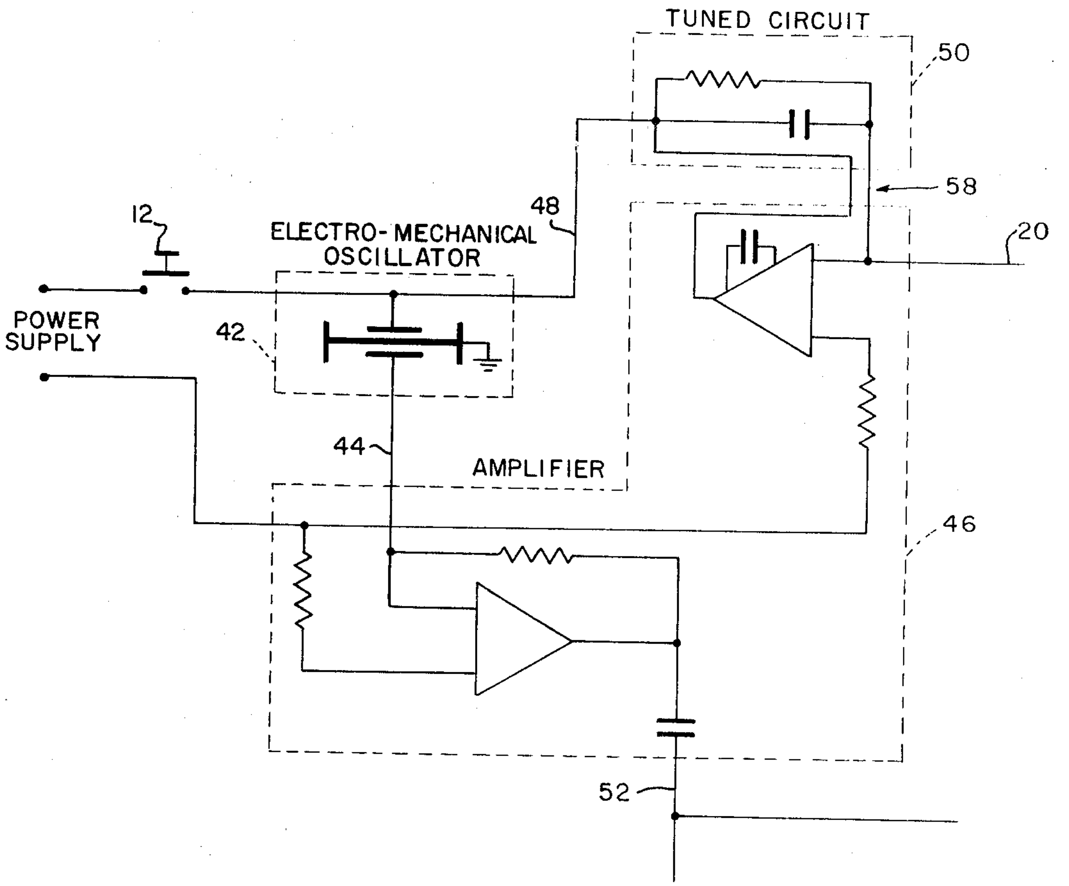
FIG. 3 is a schematic diagram of one of the control circuits shown in FIG. 2.

The interconnections between the control circuits, power supply, and tape recorder are shown in FIG. 2. As shown, each control circuit 40 has an electro-oscillator 42 connected by an output lead 44 to an amplifier 46, and connected by an input lead 48 to a tuned circuit 50. Accurate oscillation control is obtained by using a device known as a Twintron manufactured by the HB Engineering Corporation of Silver Spring, Maryland. The Twintron is an electromechanical resonator giving an especially pure resonance at its tuned frequency without harmonics which would distort its response. It oscillation is initiated by applying a DC potential or by applying an alternating signal with frequency equal to that of the Twintron's own resonant frequency, which causes it to sympathetically oscillate. The amplifier is connected by a conductor 52 to a relay 54 having contacts for controlling the operation of one of the external components. Each control circuit is connected in parallel with the remaining control circuits between a power supply 56 and the tape recorder 18. The oscillators 42 are connected respectively through the pushbutton switches 12 to one terminal of the power supply 56, and through the tuned circuits 50 by conductor 58 to the amplifiers 46. These connections are shown in the schematic of FIG. 3. Output leads from all of the amplifiers are coupled through isolating resistors 60 and joined together to form the conductor 16 which is connected to the input jack of the tape recorder. The resistors 60 prevent the oscillatory signals from feeding back along conductor 16 to energize the relays. That is, the oscillatory signals carried by conductor 16 are great enough to be recorded on the tape recorder; but said signals are too small when fed back through the resistors 60 to energize the wrong relays. The output jack of the tape recorder is connected to the sensitivity meter 24 and by the conductors 20 to all of the amplifiers 46.

By closing one of the pushbutton switches the operation causes a voltage to be applied to its associated oscillator 42 from the power supply. Application of such voltage causes the oscillator to resonate and put out an electrical signal on conductor 44 which is coupled through the associated amplifier and applied by conductor 52 to energize the corresponding relay 54. Said electrical signal output from the oscillator 42 is also coupled through the amplifier 46 and resistor 60 to the tape recorder 18 along conductor 16; and the amplitude, frequency, and duration of said electrical signals are recorded on one track of the tape recorder. If, for example, the operator is narrating a slide presentation, then one of the relay switches may be connected to operate the room lights, another relay switch may be connected to advance the slides in a slide projector, and another of the relay switches may be connected to the power circuit for the tape recorder to allow the recorder to be shut off during a live portion of the program. The operator records his narration on another track of the tape by means of the microphone 26. When the tape is played back, the narration is applied to the speaker 28 while the oscillator signals are applied to the console 10. The oscillator signals are measured by the sensitivity meter 24, and their amplitude is adjusted at the tape recorder. Said oscillator signals are then applied to all of the amplifiers by conductors 20, and then through conductors 58 to the tuned circuits 50. The oscillators are designed to resonate when their resonant frequencies are received from their corresponding tuned circuits 50. Therefore, the tuned circuit for any particular oscillator is designed to pass the resonant frequency of the oscillator to which it is connected.

I claim:

1. A switching control circuit for selectively controlling the operation of a plurality of relays, comprising:

a plurality of electromechanical resonator means each having a different resonant frequency, said resonator means each producing a resonant frequency output when a DC potential is applied thereto or when its resonant frequency is applied thereto; a tape recorder with a recording input and a playback output; a plurality of amplifier means, each of which is coupled to one of said resonator means, to said recording input to said playback output and to one said relays; each of said amplifier means amplifying the frequency output of the resonator means to which it is coupled when a DC potential is applied to said resonator means for operation of one of said relays and for input to said recording input; and each of said amplifier means amplifying said playback output to cause sympathetic oscillation by those of said resonator means whose resonant frequency is present in said playback output, the output of each of said sympathetically oscillating resonator means being amplified by the amplifier means coupled thereto, before being applied to the relay coupled to such amplifier means.

2. A switching control circuit as in claim 1, in which the tape recorder comprises a two-channel stereo tape recorder, said amplifier means being coupled to one channel and the other channel being adapted to receive an audio program.

3. A switching control circuit as in claim 1, including a plurality of tuned circuit means each coupled between one of said amplifier means and one of said resonator means and adapted to pass a frequency band containing the resonant frequency of said resonator means.